US009485455B2

(12) United States Patent
Cho et al.

(10) Patent No.: US 9,485,455 B2
(45) Date of Patent: Nov. 1, 2016

(54) SYSTEM AND METHOD FOR FORMATTING AND DISPLAYING VIDEO DATA

(75) Inventors: Nam Chin Cho, Newnan, GA (US); Dallas Dwight Hickerson, Sharpsburg, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 2672 days.

(21) Appl. No.: 12/148,062

(22) Filed: Apr. 16, 2008

(65) Prior Publication Data

US 2009/0262239 A1 Oct. 22, 2009

(51) Int. Cl.

| | |
|---|---|
| ***H04N 7/025*** | (2006.01) |
| ***H04N 7/01*** | (2006.01) |
| ***H04N 21/4402*** | (2011.01) |
| ***H04N 21/2343*** | (2011.01) |

(52) U.S. Cl.
CPC .... *H04N 7/0122* (2013.01); *H04N 21/234363* (2013.01); *H04N 21/440272* (2013.01)

(58) Field of Classification Search
CPC .................. H04N 7/0122; H04N 21/440272; H04N 7/0117; H04N 21/234363; H04N 21/44029
USPC .................. 348/445, 556, 558; 380/270–272
See application file for complete search history.

(56) References Cited

U.S. PATENT DOCUMENTS

| | | | | |
|---|---|---|---|---|
| 7,212,218 | B2 | 5/2007 | Suzuki et al. | |
| 7,339,627 | B2 | 3/2008 | Schoner et al. | |
| 2004/0114049 | A1* | 6/2004 | Arora | 348/445 |
| 2007/0022448 | A1 | 1/2007 | Muench-Casanova et al. | |
| 2007/0081257 | A1* | 4/2007 | Bowron et al. | 359/668 |

FOREIGN PATENT DOCUMENTS

| | | | |
|---|---|---|---|
| DE | 102006011010 | B3 | 10/2007 |
| EP | 0691792 | A2 | 1/1996 |
| JP | 05-207397 | H | 8/1993 |
| JP | 07-322168 | H | 12/1995 |
| JP | 08-046809 | H | 2/1996 |
| JP | 10-200828 | H | 7/1998 |
| JP | 2004-186803 | | 7/2004 |
| JP | 2006-060562 | | 3/2006 |
| KR | 10-20080012609 | A | 2/2008 |
| WO | 2006112808 | A1 | 10/2006 |

* cited by examiner

*Primary Examiner* — Pankaj Kumar
*Assistant Examiner* — Alazar Tilahun
(74) *Attorney, Agent, or Firm* — Laurence S. Roach, Esq.

(57) ABSTRACT

There is provided a system (200) and method (400) of displaying video content. In a method (400) in accordance with an exemplary embodiment of the present invention, a native aspect ratio of the video content is determined (404) and an optimized viewing format is selected (406) from a plurality of viewing formats based at least in part on the native aspect ratio of the video content. The video content is displayed (408) in the optimized viewing format.

5 Claims, 4 Drawing Sheets

206
Video_TS.BUP
Video_TS.IFO
Video_TS.VOB
VTS_01_0.BUP
VTS_01_0.IFO
VTS_01_1.VOB
VTS_01_2.VOB
VTS_01_3.VOB
VTS_01_4.VOB
Representative DVD File Format:
While the main content of DVD-Video disc are the VOB files which contain the actual MPEG-2 audio, video and subtitle streams, the IFO files provide information for DVD player where DVD-Video disc's chapters start, where certain audio tracks are located, etc..
204
Representative buttons: DVD transport functions
MENU
SETUP
208
DVD Deck
202
Microcontroller reads the aspect ratio from the appropriate .ifo file(s) at the time of playback.
Microcontroller
200
210
Control: selects Normal, Full, or Zoom
LCD Panel
Pixels are arranged (Horizontal to Vertical) in 16:9 ratio
Video from DVD Deck: one of several possible aspect ratios.
112

BEGIN
402
DETERMINE A NATIVE ASPECT RATIO OF VIDEO CONTENT TO BE DISPLAYED
404
SELECT AN OPTIMIZED VIEWING FORMAT FROM A PLURALITY OF VIEWING FORMATS BASED AT LEAST IN PART ON THE NATIVE ASPECT RATIO OF THE VIDEO CONTENT
406
DISPLAY THE VIDEO CONTENT IN THE OPTIMIZED VIEWING FORMAT
408
END
410
400

SYSTEM AND METHOD FOR FORMATTING AND DISPLAYING VIDEO DATA

FIELD OF THE INVENTION

The present invention generally relates to video systems. In particular, the present invention relates to a system and method for formatting the display of video data based at least in part on a native aspect ratio of the video data.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In existing video systems, video content may be provided in a wide variety of aspect ratios (the ratio of the length of viewable display area to the height of viewable display area). Moreover, there is no standard aspect ratio for video content. Popular aspect ratios include 1.33:1 (4:3), 1.66:1 (15:9), 1.78:1 (16:9), 1.85:1 and 2.35:1, to name just a few examples.

Most display systems have a display device with a fixed aspect ratio. This means that a displayed image may appear distorted to a viewer if the native aspect ratio of the video content is different from the aspect ratio of the display device. Another potential problem is the display of "black bars" (areas where no video content is present) at the top and bottom or sides (or both) of a displayed image having a different aspect ratio. This results in a smaller video display, which can cause viewer dissatisfaction. Some known systems have "zoom" features, which perform an adjustment on displayed video to better accommodate the showing of video content from a source having a different aspect ratio. However, the large number of aspect ratios currently available could render the use of such "zoom" features cumbersome and ineffective for at least some aspect ratios. Moreover, the user may be forced so choose from among several display options by trial and error to find the desired setting. An improved system and method for formatting video data having a different native aspect ratio relative to a display device is desirable.

SUMMARY OF THE INVENTION

There is provided a system and method of displaying video content. In a method in accordance with an exemplary embodiment of the present invention, a native aspect ratio of the video content is determined and an optimized viewing format is selected from a plurality of viewing formats based at least in part on the native aspect ratio of the video content. The video content is displayed in the optimized viewing format.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
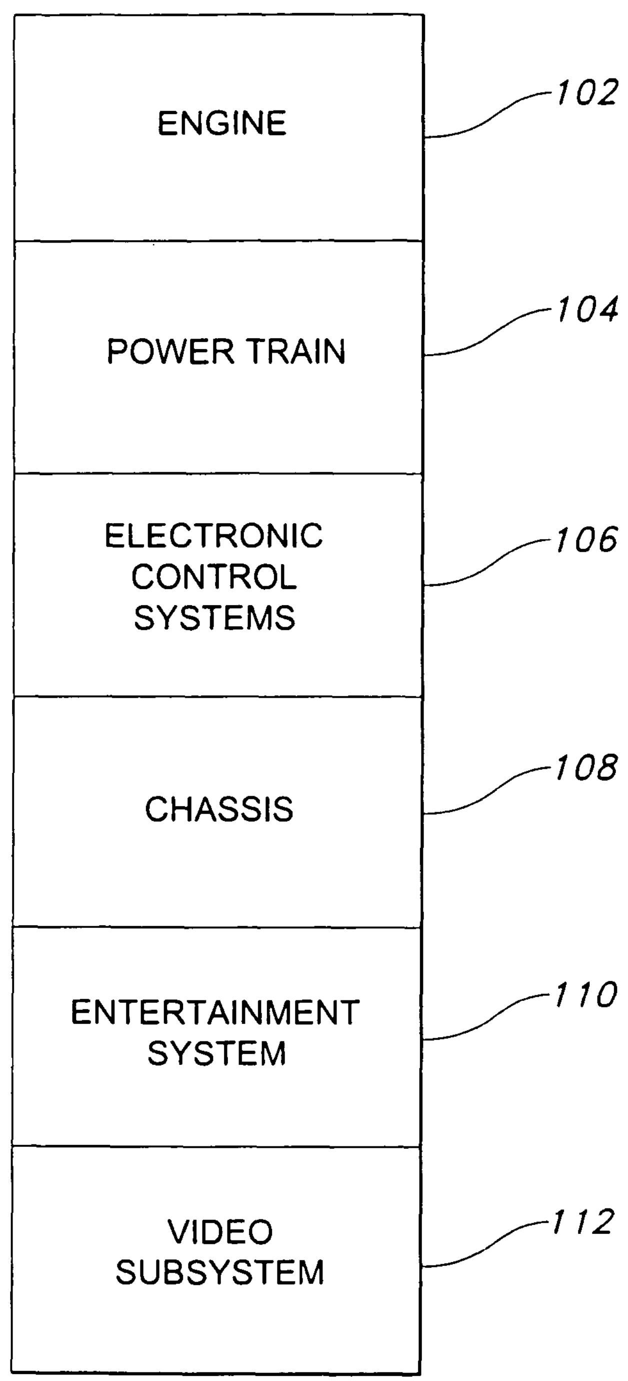
FIG. 1 is a block diagram of a motorized vehicle in accordance with an exemplary embodiment of the present invention.

FIG. 1 is a block diagram of a motorized vehicle in accordance with an exemplary embodiment of the present invention. The motorized vehicle is generally represented by the reference number 100. The exemplary motorized vehicle 100 comprises an engine 102, a power train 104, a plurality of electronic control systems 106 that may be adapted to control a number of vehicle systems (for example, the engine, the power train, a heating ventilation air conditioning (HVAC) system, to name a few examples), and a chassis 108. The chassis 108 is adapted to support the engine 102, which is adapted to drive the power train 104. Also included in the exemplary motorized vehicle 100 is an entertainment system, which may provide audio/visual entertainment, computer networking capability or the like to occupants of the motorized vehicle 100. The entertainment system 110 comprises a video subsystem 112, the operation of which is explained in greater detail below. In particular, the video subsystem 112 is adapted to select an optimized viewing mode for video data read from a source input regardless of the native aspect ratio of the video data.

Figure 2:
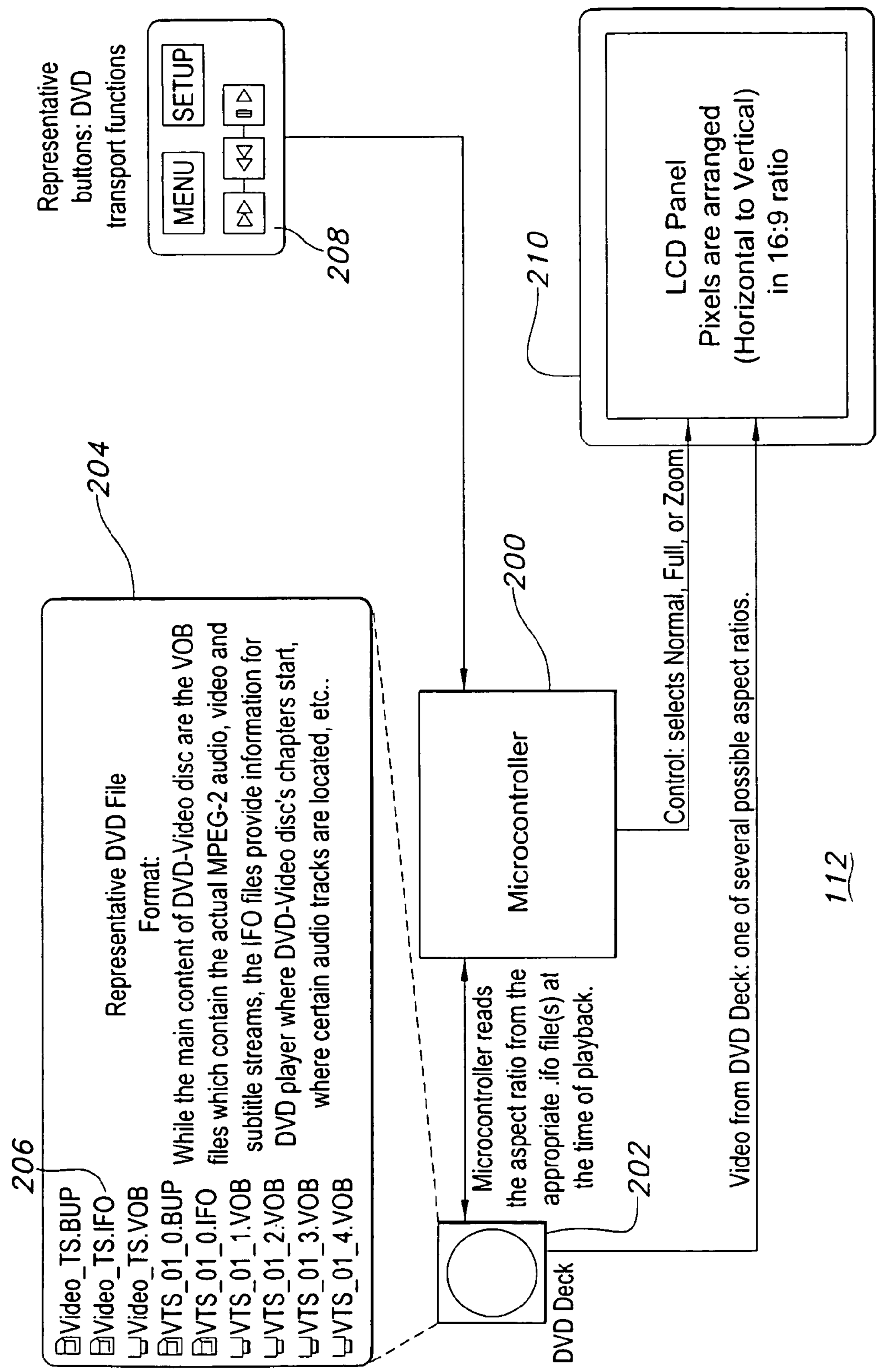
FIG. 2 is a diagram of a video subsystem of the vehicle shown in FIG. 1 in accordance with an exemplary embodiment of the present invention.

FIG. 2 is a block diagram of the video subsystem 112 of the vehicle 100 shown in FIG. 1 in accordance with an exemplary embodiment of the present invention. The video subsystem 112 comprises a processor or microcontroller 200, which is adapted to control the overall operation of the video subsystem 112. The processor 200 may be adapted to read instructions and/or data from a tangible machinereadable media, such as a disc drive, a memory or the like. The instructions may enable the processor 200 to perform a method in accordance with an exemplary embodiment of the present invention.

The processor 200 is operatively connected to a DVD deck 202, which may contain a DVD media 204 as a source of video information. In addition to storing one or more files of video data, the DVD media 204 may additionally store an information file 206, such as an .ifo file or the like. The information file 206 may contain information pertaining to where chapters of different video information start on the DVD media 204, where certain audio tracks are located or the like. In addition, the information file 206 may store other information such as a native aspect ratio of video information stored on the DVD media 204, whether the video data is in anamorphic format, whether the video data is in non-anamorphic format or the like.

The video subsystem 112 includes a user control panel 208. As shown in FIG. 2, the user control panel 208 may comprise controls such as MENU, SET-UP, FAST FORWARD, REWIND, PAUSE, PLAY, or the like. Users of the video system 112 may use the controls on the control panel 208 to control the operation of the video subsystem 112.

In an exemplary embodiment of the present invention, the processor 200 is adapted to select an optimized viewing format for video information so that it is displayed effectively on a display panel 210. In the exemplary embodiment illustrated in FIG. 2, the display panel 210 has a fixed aspect ratio of 16:9. The processor 200 uses the aspect ratio information obtained about the video data being played to optimize the image displayed on the display panel 210. In particular, an exemplary embodiment of the present invention selects an optimized viewing format based on design considerations such as using the maximum screen area of the display panel 210 for displaying the image while minimizing distortion of the image, regardless of the native aspect ratio of the video information being displayed. Specific examples of how the optimized viewing format is selected in accordance with an exemplary embodiment of the present invention are illustrated in FIG. 3.

Figure 3:
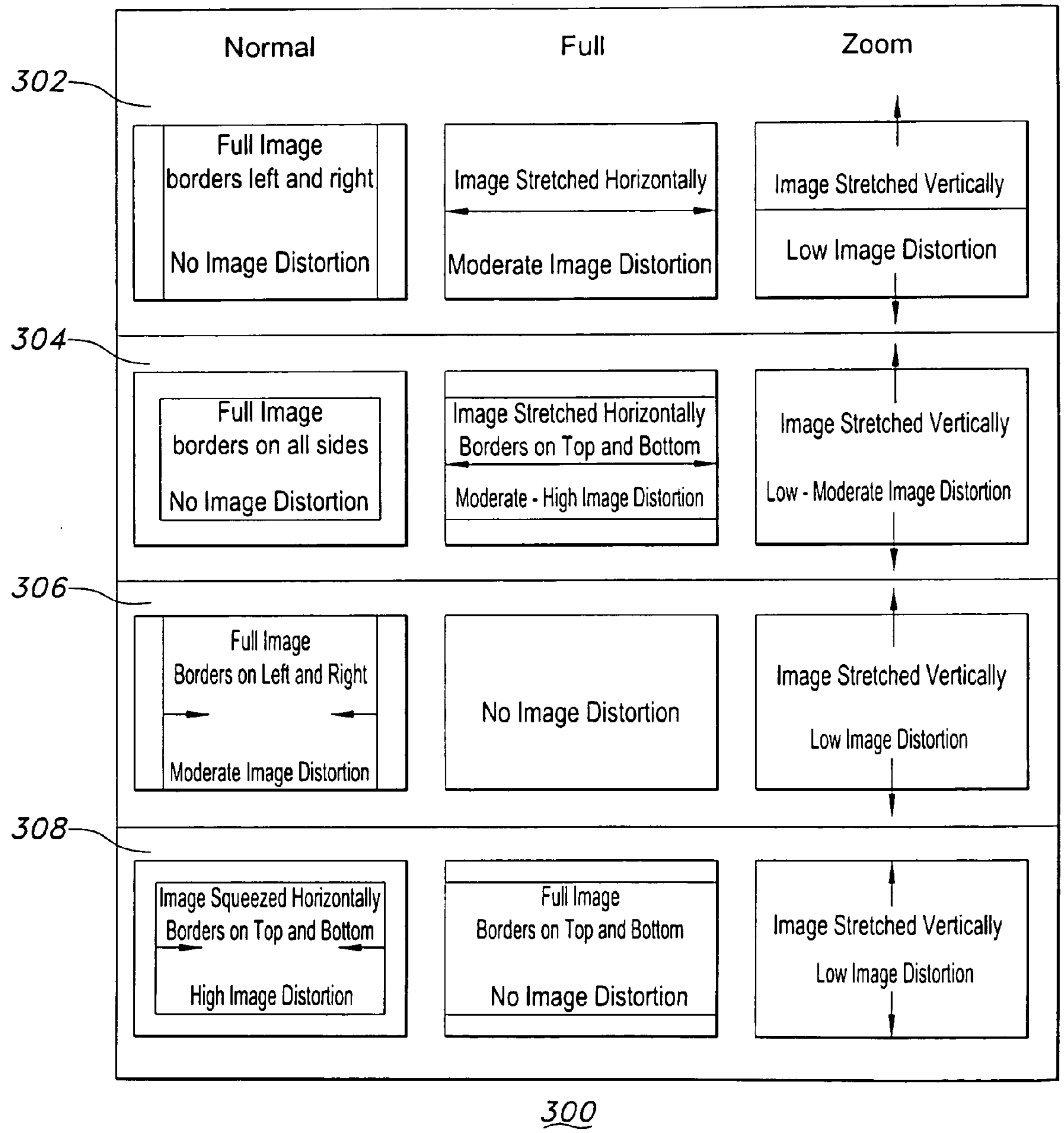
FIG. 3 is a diagram showing several examples of how an optimized viewing format is selected in accordance with an exemplary embodiment of the present invention.

FIG. 3 is a diagram showing several examples of how an optimized viewing format is selected in accordance with an exemplary embodiment of the present invention. The diagram is generally referred to by the reference number 300. The diagram 300 illustrates four different video formatting scenarios, each representing the displaying of video data having a particular aspect ratio, range of aspect ratios and other defining characteristics. Three screen views are shown for each of the four video formatting scenarios: a normal viewing mode, a full viewing mode and a zoom viewing mode. Thus, each of the four horizontal groupings of screen views corresponds to one of the four different video display scenarios illustrated in FIG. 3.

As explained in detail below, a video system that operates in accordance with an exemplary embodiment of the present invention is adapted to determine a native aspect ratio of video content that is being displayed and to select an optimized viewing mode (for example, the normal viewing mode, the full viewing mode or the zoom viewing mode) based at least in part on the native aspect ratio of the video content. In an exemplary embodiment of the present invention, the normal viewing mode displays data in its native aspect ratio regardless of the aspect ratio of the display screen. In an exemplary full viewing mode, video data is "stretched" along one axis (for example, horizontal or vertical) so that the entire display screen is filled. In an exemplary zoom viewing mode, video data may be stretched along both axes (for example, horizontal and vertical) to essentially magnify an area of content while filling the entire display screen. In the exemplary zoom viewing mode, video data is less distorted in some cases than in the full viewing mode, but all of the original video data may not be displayed because of cropping excess video data to allow the picture to be expanded along the opposite axis. For example, video data may be cropped from the top and bottom as the image is expanded along the horizontal axis to fill the entire display panel.

The viewing format chosen as the optimized viewing format may vary depending on the aspect ratio of the display panel of a particular video system. For example, the optimized viewing format may not be the same in a video system having a display panel with an aspect ratio of 4:3 as it would be in a video system having a display panel with an aspect ratio of 16:9. All the screen views shown in FIG. 3 represent how video data would be displayed on a display screen having an aspect ratio of 16:9. This corresponds to the aspect ratio of the display screen 210 (FIG. 2). Those of ordinary skill in the art will appreciate that the determination of which viewing mode is chosen as the optimized viewing mode may be made based on which available viewing mode would result in filling the most of the display panel with video data while providing the least amount of distortion.

In an exemplary embodiment of the present invention, the processor 200 (FIG. 2) may be adapted to automatically read the aspect ratio of video data being displayed. For example, the aspect ratio may be read from the information file 206 (FIG. 2). In other exemplary embodiments, the native aspect ratio of the video data being displayed may be determined by any suitable method known to those of ordinary skill in the art.

A first video formatting scenario 302 relates to the formatting of image data having a native aspect ratio of 4:3. This type of video content includes video data that may have been created in another aspect ratio and subsequently processed using a technique know to those of ordinary skill in the art as "pan and scan" formatting. In pan and scan formatting, a 4:3 window of video content is selected from video data in a different (normally wider) format to produce video content having an aspect ratio of 4:3. The normal view for the first video scenario 302 shows a screen view of the image area that would be displayed on a display having an aspect ratio of 16:9 if the video information is displayed in its native 4:3 aspect ratio format. As shown in FIG. 3, this normal view would result in black borders having no video image content on both the right and left sides of the screen.

In the full view for the first video formatting scenario 302, the image is stretched horizontally so that it occupies the entire 16:9 display. This horizontal stretching results in moderate image distortion because no corresponding vertical stretching is performed on the image.

In the zoom view of the first video formatting scenario, the full image is stretched vertically so that some video information is cropped from the display, as shown by the arrows in the zoom view for the first video formatting scenario 302. By performing the additional vertical stretching, image distortion is reduced with respect to the full view.

An exemplary embodiment of the present invention is adapted to select the zoom viewing mode as the optimized viewing mode if the video content being displayed has a native aspect ratio of 4:3 if the display panel of the video system is 16:9. By automatically displaying video content having a native aspect ratio of 4:3 in the zoom mode as the optimized viewing mode, the user is provided with a picture that fills the entire display screen and has relatively low distortion with respect to the full viewing mode. Thus, an exemplary embodiment of the present invention provides an optimized display without requiring the user to manually select the viewing mode from a plurality of choices. In an alternative embodiment of the invention, the user may be given the opportunity to provide an input regarding a preference of viewing modes. For example, the user could be allowed to select a particular viewing mode to be used for displaying all video, regardless of native aspect ratio. As another example, the user could be allowed to enter a preference selected from a group of choices such as "least distortion" or "maximum screen utilization."

A second video formatting scenario 304 relates to the formatting of video having a native aspect ratio in the range of 1.66:1 to 2.35:1 that is additionally in non-anamorphic format. Such video formatting may be described as wide-screen non-anamorphic video formatting. In colloquial terms, this type of formatting is sometimes referred to as "letter boxed" formatting.

In the normal view of the second display formatting scenario 304, the entire image is displayed, but there are borders on all sides of the screen that contain no video data. In the full viewing mode of the second video formatting scenario 304, the image is horizontally stretched so that it occupies the entire horizontal range of the display. Nonetheless, borders having no video data are still present on the top and bottom of the screen, resulting in moderate to high image distortion. In the zoom view of the second video formatting scenario 304, the video data that would be presented in the full view is stretched vertically, as shown by the arrows in the zoom view. The zoom view in the second video formatting scenario 304 thus presents the viewer with a full video display with low to moderate image distortion.

An exemplary embodiment of the present invention is adapted to select the zoom viewing mode as the optimized viewing mode if the video content being displayed is non-anamorphic and has a native aspect ratio in the range of 1.66:1 to 2.35:1 if the display panel of the video system is 16:9. By automatically displaying video content with these characteristics in the zoom mode as the optimized viewing mode, the user is provided with a picture that fills the entire display screen and has relatively low distortion with respect to the full viewing mode.

A third video formatting scenario 306 relates to the formatting of media content having an aspect ratio in the range of 1.66:1 to 1.85:1 that is in anamorphic format. Such video content is typically referred to as wide-screen anamorphic video content. In the normal view of the third video formatting scenario 306, the wide-screen anamorphic video data appears to be horizontally squeezed, as shown by the inward arrows. The result is moderate image distortion and bands containing no video information along the left and right sides of the display.

In the full view of the third video formatting scenario 306, the anamorphic wide-screen video data is horizontally stretched with respect to the normal view so that it occupies the entire display. The result is a distortion-free image that fills the entire display screen. In the zoom view of the third video formatting scenario 306, the full image is stretched vertically so that some video information is cropped from the display as shown by the arrows. In an exemplary embodiment of the present invention, the processor 200 (FIG. 2) may be adopted to automatically display the full view as the optimized viewing mode for wide screen anamorphic video content having a native aspect ratio in the range of 1.66:1 to 1.85:1. In this manner, the viewer is automatically presented with a completely filled video screen having no image distortion.

A fourth video formatting scenario 308 relates to the formatting of anamorphic video content having an aspect ratio of 2.35:1. In the normal view of the fourth video formatting scenario 308, the image appears to be squeezed horizontally, as shown by the inward arrows. The result is a highly distorted video image having borders on both sides as well as on the top and bottom. In the full view of the fourth video formatting scenario 308, the native image is stretched horizontally so that it is displayed without image distortion. This nonetheless leaves borders with no video content along the top and bottom edges of the screen. In the zoom view of the fourth video formatting scenario 308, the full image is stretched vertically until it fills the entire screen. This results in a low-level of image distortion.

For anamorphic video data having a native aspect ratio of 2.35:1, an exemplary embodiment of the present invention may be adapted to automatically select either the full viewing mode or the zoom viewing mode as the optimized viewing mode based on system design considerations. Choosing the full viewing mode as the optimized viewing mode results in an image that has no distortion but that does not fill the entire display screen. Choosing the zoom mode as the optimized viewing mode produces an image that fills the entire video panel but has some amount of distortion. Those of ordinary skill in the art will appreciate that the aspect ratio of the display panel of the video system in which the invention is applied may influence the choice of optimized viewing mode under these conditions.

Figure 4:
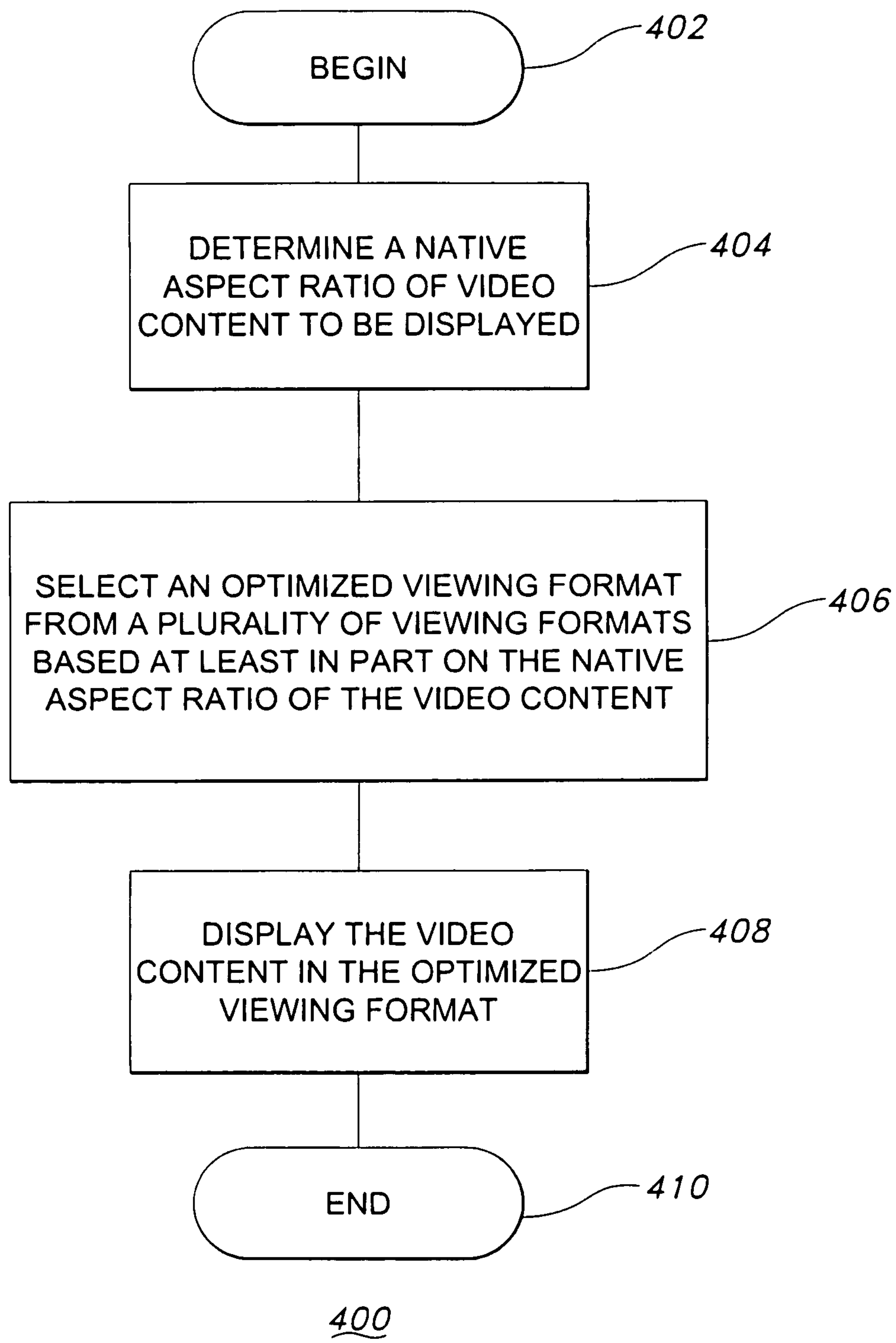
FIG. 4 is a process flow diagram of a method in accordance with an exemplary embodiment of the present invention.

FIG. 4 is a process flow diagram of a method in accordance with an exemplary embodiment of the present invention. The method is generally referred to by the reference number 400.

At block 402, the process begins. At block 404, the native aspect ratio of video content to be displayed is determined. As set forth above, the aspect ratio may be read from an information file 206 (FIG. 2) such as an .ifo file or determined by any other suitable method.

At block 406, an optimized viewing format is selected from among a plurality of viewing formats based at least in part on the native aspect ratio of the video content. In the exemplary embodiment of the present invention discussed above with reference to FIG. 3, the optimized viewing mode is determined to be a normal viewing mode, a full viewing mode or a zoom viewing mode. In addition to the native aspect ratio of the video content to be displayed, other factors may be considered. Examples of other factors that may influence the choice of the optimized viewing mode include whether the video data to be displayed is anamorphic or non-anamorphic.

At block 408, the video data is displayed in the optimized viewing format. At block 410, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method (400) of displaying video content, the method comprising:

determining (404) a native aspect ratio of the video content;

selecting (406) an optimized viewing format from a plurality of viewing formats based at least in part on the native aspect ratio of the video content, wherein the plurality of viewing formats comprises a full viewing format in which the video content is stretched along one axis until it fills an entire display panel; and displaying (408) the video content in the optimized viewing format.

2. A method (400) of displaying video content, the method comprising:

determining (404) a native aspect ratio of the video content;

selecting (406) an optimized viewing format from a plurality of viewing formats based at least in part on the native aspect ratio of the video content, wherein the plurality of viewing formats comprises a zoom viewing format in which the video content is stretched along two axes to magnify an area of the video content; and displaying (408) the video content in the optimized viewing format.

3. A method (400) of displaying video content, the method comprising:

determining (404) a native aspect ratio of the video content;

selecting (406) an optimized viewing format from a plurality of viewing formats based at least in part on the native aspect ratio of the video content, wherein a zoom viewing mode in which the video content is stretched along two axes to magnify an area of the video content is automatically selected as the optimized viewing mode if the native aspect ratio of the video content is 4:3; and displaying (408) the video content in the optimized viewing format.

4. A method (400) of displaying video content, the method comprising:

determining (404) a native aspect ratio of the video content, wherein determining the native aspect ratio of the video content comprises reading the native aspect ratio from an information file associated with the video content;

selecting (406) an optimized viewing format from a plurality of viewing formats based at least in part on the native aspect ratio of the video content; and displaying (408) the video content in the optimized viewing format.

5. A video system (200), comprising:

a source (202) of video data;

a processor (200) that is adapted to read the video data from the source of video data, to determine a native aspect ratio of the video data, and to select an optimized viewing format from a plurality of viewing formats based at least in part on the native aspect ratio of the video content, wherein the plurality of viewing formats comprises:

a normal viewing format in which the video content is displayed in its native aspect ratio;

a full viewing format in which the video content is stretched along one axis until it fills an entire display panel; and a zoom viewing format in which the video content is stretched along two axes to magnify an area of the video content; and a display panel (210) that is adapted to display video data provided by the processor (200) in the optimized viewing format.

* * * * *